US012330329B2

(12) United States Patent
Schomber, Jr. et al.

(10) Patent No.: US 12,330,329 B2
(45) Date of Patent: Jun. 17, 2025

(54) ROTARY DIE CUTTING DEVICE AND METHOD FOR SETTING A GAP DIMENSION OF A GAP BETWEEN A DIE CUTTING CYLINDER AND A COUNTER PRESSURE CYLINDER OF THE ROTARY DIE CUTTING DEVICE

(71) Applicant: Maxcess Americas, Inc., Oklahoma City, OK (US)

(72) Inventors: Charles E. Schomber, Jr., Catawissa, MO (US); Travis Turnbough, Rosebud, MO (US); Md M. Haque, Edmond, OK (US); Darcy Winter, Oklahoma City, OK (US); Robert Marvel, Norman, OK (US); Vladimir V. Mayer, Edmond, OK (US)

(73) Assignee: Maxcess Americas, Inc., Oklahoma City, OK (US)

( * ) Notice: Subject to any disclaimer, the term of this patent is extended or adjusted under 35 U.S.C. 154(b) by 32 days.

(21) Appl. No.: 17/217,226

(22) Filed: Mar. 30, 2021

(65) Prior Publication Data

US 2022/0314481 A1 Oct. 6, 2022

(51) Int. Cl.
*B26D 7/26* (2006.01)
*B26F 1/38* (2006.01)

(52) U.S. Cl.
CPC .............. *B26D 7/265* (2013.01); *B26F 1/384* (2013.01)

(58) Field of Classification Search
CPC .. B26D 1/52; B26D 3/225; B26D 2007/2664; B26D 7/00; B26D 7/265; B26D 5/28; B26F 1/384
(Continued)

(56) References Cited

U.S. PATENT DOCUMENTS 4,130,042 A * 12/1978 Reed ...................... F16C 13/02 83/881
5,212,647 A 5/1993 Raney et al.
(Continued)

FOREIGN PATENT DOCUMENTS

DE 102013208909 A1 11/2014
DE 102015116198 A1 3/2017
(Continued)

*Primary Examiner* — Nhat Chieu Q Do
(74) *Attorney, Agent, or Firm* — McNees Wallace & Nurick LLC

(57) ABSTRACT

A method for setting a gap dimension of a gap between a die cutting cylinder and a counter pressure cylinder of a rotary die cutting device includes providing a control system including a controller, at least one sensor, and an adjusting device actuated by the control system. The method further includes actuating the adjusting device in response to the at least one sensor sensing a deviation of a web being processed from a desired state which includes a set of one or more detectable parameters with quantifiable and measurable variables, thereby setting the gap dimension between the rotary die cutting device and the counter pressure cylinder, in which actuating the adjusting device is achieved as a result of the control system operating in a closed feedback loop. The method further includes sensing by the at least one sensor occurring with or without disruption of operation of the rotary die cutting device.

15 Claims, 3 Drawing Sheets

(58) Field of Classification Search
USPC ............................................................. 83/344
See application file for complete search history.

(56) References Cited

U.S. PATENT DOCUMENTS

| | | | | |
|---|---|---|---|---|
| 6,100,989 | A | 8/2000 | Luwa | |
| 6,112,658 | A | 9/2000 | Gunther et al. | |
| 6,556,291 | B2 | 4/2003 | Yonezawa | |
| 6,950,547 | B2 | 9/2005 | Floeder et al. | |
| 7,027,934 | B2 | 4/2006 | Skeps et al. | |
| 7,333,650 | B2 | 2/2008 | Yamamoto et al. | |
| 8,011,280 | B2 * | 9/2011 | Liebheit | B26D 5/00 83/494 |
| 8,281,694 | B2 | 10/2012 | Okihara | |
| 8,935,104 | B2 | 1/2015 | Floeder et al. | |
| 9,061,435 | B1 | 6/2015 | Proudfoot et al. | |
| 9,738,004 | B2 | 8/2017 | Ebrecht | |
| 9,969,191 | B2 | 5/2018 | Masubuchi et al. | |
| 10,115,040 | B2 | 10/2018 | Brauer | |
| 10,346,969 | B1 | 7/2019 | Raghu et al. | |
| 10,395,362 | B2 | 8/2019 | Gupta et al. | |
| 10,599,951 | B2 | 3/2020 | Bhaskar et al. | |
| 10,634,621 | B2 | 4/2020 | Kano et al. | |
| 2001/0031079 | A1 | 10/2001 | Ryder | |
| 2002/0191831 | A1 | 12/2002 | Spoto et al. | |
| 2008/0022821 | A1 | 1/2008 | Hendrik | |
| 2008/0026090 | A1 | 1/2008 | Ehrbar | |
| 2013/0042771 | A1 * | 2/2013 | Alkhagen | B26D 7/265 101/23 |
| 2017/0322186 | A1 | 11/2017 | Su et al. | |
| 2018/0281218 | A1 | 10/2018 | Urrutia Nebreda et al. | |
| 2019/0025805 | A1 | 1/2019 | Cella et al. | |
| 2019/0041845 | A1 | 2/2019 | Cella et al. | |
| 2019/0121350 | A1 | 4/2019 | Cella et al. | |
| 2019/0129405 | A1 | 5/2019 | Cella et al. | |
| 2019/0129408 | A1 | 5/2019 | Cella et al. | |
| 2019/0137985 | A1 | 5/2019 | Cella et al. | |
| 2019/0146474 | A1 | 5/2019 | Cella et al. | |
| 2019/0146478 | A1 | 5/2019 | Cella et al. | |
| 2019/0197679 | A1 | 6/2019 | Fang et al. | |
| 2019/0318469 | A1 | 10/2019 | Wang | |
| 2020/0005070 | A1 | 1/2020 | Ambikapathi et al. | |
| 2020/0005141 | A1 | 1/2020 | Ambikapathi et al. | |
| 2020/0020094 | A1 | 1/2020 | Chang | |
| 2020/0096994 | A1 | 3/2020 | Cella et al. | |
| 2020/0103890 | A1 | 4/2020 | Cella et al. | |
| 2020/0110397 | A1 | 4/2020 | Cella et al. | |
| 2020/0110399 | A1 | 4/2020 | Cella et al. | |
| 2020/0254644 | A1 | 8/2020 | de Natris | |
| 2024/0109744 | A1 * | 4/2024 | Montagnani | B26D 7/204 |

FOREIGN PATENT DOCUMENTS

| | | | | |
|---|---|---|---|---|
| DE | 102017122071 | A1 | 3/2019 | |
| EP | 3147089 | A1 * | 3/2017 | B26D 3/08 |
| WO | WO-2008043497 | A1 * | 4/2008 | B26D 7/2628 |
| WO | 2011095228 | A1 | 8/2011 | |
| WO | WO-2011095633 | A1 * | 8/2011 | B26D 5/007 |
| WO | 2016070053 | A1 | 5/2016 | |
| WO | 2018165753 | A1 | 9/2018 | |
| WO | 2019057254 | A1 | 3/2019 | |
| WO | WO-2019057839 | A1 * | 3/2019 | B26D 5/00 |
| WO | 2019107614 | A1 | 6/2019 | |
| WO | 2019215746 | A1 | 11/2019 | |
| WO | 2019219598 | A1 | 11/2019 | |
| WO | 2019239283 | A1 | 12/2019 | |
| WO | 2020048119 | A1 | 3/2020 | |
| WO | 2020048248 | A1 | 3/2020 | |
| WO | 2020053139 | A1 | 3/2020 | |
| WO | 2020079568 | A1 | 4/2020 | |

* cited by examiner

ROTARY DIE CUTTING DEVICE AND METHOD FOR SETTING A GAP DIMENSION OF A GAP BETWEEN A DIE CUTTING CYLINDER AND A COUNTER PRESSURE CYLINDER OF THE ROTARY DIE CUTTING DEVICE

FIELD OF THE INVENTION

The present invention is directed to die cutting apparatus and methods for controlling die cutting apparatus.

BACKGROUND OF THE INVENTION

Operational & quality control of die cutting processes is of course as old as the invention of the die cutting itself. Control schemes for this process have been in large part manual in nature. Although control schemes involving the use of electrical actuators has recently gained popularity, control schemes using feedback to achieve fully automated control have received little attention. Such control schemes require skilled operators to make process modification determinations, typically requiring shutting down operation of the production line, which is inefficient, disruptive, and costly. Moreover, such control schemes do not include pre-emptive corrective actions encountered during operation of the die cutting apparatus, such as automatically adjusting a gap dimension between a rotary die cutting device and a counter pressure cylinder prior to encountering a splice joint of the material being fed therebetween, the absence of such pre-emptive corrective actions resulting in premature wear of the contact surfaces.

There is a need in the art for a die cutting apparatus and control schemes that do not suffer from the above shortcomings.

SUMMARY OF THE INVENTION

In one embodiment, a method for setting a gap dimension of a gap between a die cutting cylinder and a counter pressure cylinder of a rotary die cutting device includes providing a control system including a controller, at least one sensor, and an adjusting device actuated by the control system. The method further includes actuating the adjusting device in response to the at least one sensor sensing a deviation from a desired state, thereby setting the gap dimension between the rotary die cutting device and the counter pressure cylinder, in which actuating the adjusting device is achieved as a result of the control system operating in a closed feedback loop. The method further includes sensing by the at least one sensor occurring with or without disruption of operation of the rotary die cutting device.

In one embodiment, the step of actuating the adjusting device in response to the at least one sensor sensing a deviation from a desired state includes the deviation from a desired state being a splice joint of at least one of a backing web and an overlying second web.

In one embodiment, the step of actuating the adjusting device in response to the at least one sensor sensing a deviation from a desired state includes the deviation from a desired state being a change in thickness of at least one of a backing web and an overlying second web.

In one embodiment, the step of actuating the adjusting device in response to at least one sensor of the plurality of sensors sensing a deviation from a desired state includes the deviation from a desired state being at least one of a change of material of at least one of a backing web and an overlying second web (the overlying second web becoming punched labels and a matrix web subsequent to being directed between the die cutting cylinder and the counter pressure cylinder), thermal expansion of at least one of the backing web and the overlying second web, a change in humidity of an environment surrounding the rotary die cutting device, a change in a tension gradient of at least one of the backing web and the overlying second web, a cut depth of the punched labels and the matrix web, and an impression quality of the punched labels and the matrix web.

In one embodiment, the control system employs artificial intelligence methods to control the rotary die cutting device.

In one embodiment, the control system employs machine learning methods to control the rotary die cutting device.

In one embodiment, the control system employs deep learning methods to control the rotary die cutting device.

In one embodiment, a method for setting a gap dimension of a gap between a die cutting cylinder and a counter pressure cylinder of a rotary die cutting device includes providing a control system comprising a controller, at least one sensor, and an adjusting device actuated by the control system. The method further includes actuating the adjusting device in response to the at least one sensor sensing a deviation from a desired state, thereby setting the gap dimension between the rotary die cutting device and the counter pressure cylinder, in which actuating the adjusting device is achieved as a result of the control system operating in a closed feedback loop. During operation of the rotary die cutting device, a backing web and an overlying second web are directed between the die cutting cylinder and a counter pressure cylinder, the second web becoming punched labels and a matrix web subsequent to being directed between the die cutting cylinder and the counter pressure cylinder. The method further includes sensing by the at least one sensor occurring in an absence of or prior to separation of the punched labels, the backing web, and the matrix web from one another. The method further includes sensing by the at least one sensor occurring without disruption of operation of the rotary die cutting device.

In one embodiment, a rotary die cutting device includes a die cutting cylinder, a counter pressure cylinder separated from the die cutting cylinder by a gap, and a control system comprising a controller, at least one sensor, and an adjusting device actuated by the control system. The rotary die cutting device further includes the adjusting device is operably connected to the die cutting cylinder and the counter pressure cylinder. The rotary die cutting device further includes in response to the at least one sensor sensing a deviation from a desired state, the control system is adapted to operate in a closed feedback loop for setting a gap dimension of the gap between the rotary die cutting device and the counter pressure cylinder. The rotary die cutting device further includes during operation of the rotary die cutting device, a backing web and an overlying second web are directed between the die cutting cylinder and the counter pressure cylinder, the second web becoming punched labels and a matrix web subsequent to being directed between the die cutting cylinder and the counter pressure cylinder. The rotary die cutting device further includes sensing by the at least one sensor occurring in an absence of or prior to separation of the punched labels, the backing web, and the matrix web from one another. The rotary die cutting device further includes sensing by the at least one sensor occurring with or without disruption of operation of the rotary die cutting device.

In one embodiment, a method for setting a gap dimension of a gap between a die cutting cylinder and a counter pressure cylinder of a rotary die cutting device includes providing a control system including a controller, at least one sensor, and an adjusting device actuated by the control system, and components of the control system communicate with one another within a machine network. The method further includes actuating the adjusting device in response to the at least one sensor sensing a deviation from a desired state, thereby setting the gap dimension between the rotary die cutting device and the counter pressure cylinder, in which actuating the adjusting device is achieved as a result of the control system operating in a closed feedback loop. The method further includes sensing by the at least one sensor occurring with or without disruption of operation of the rotary die cutting device.

In one embodiment, a method for setting a gap dimension of a gap between a die cutting cylinder and a counter pressure cylinder of a rotary die cutting device includes providing a control system comprising a controller, at least one sensor, and an adjusting device actuated by the control system, and components of the control system communicate with one another within a machine network. The method further includes actuating the adjusting device in response to the at least one sensor sensing a deviation from a desired state, thereby setting the gap dimension between the rotary die cutting device and the counter pressure cylinder, in which actuating the adjusting device is achieved as a result of the control system operating in a closed feedback loop. During operation of the rotary die cutting device, a backing web and an overlying second web are directed between the die cutting cylinder and a counter pressure cylinder, the second web becoming punched labels and a matrix web subsequent to being directed between the die cutting cylinder and the counter pressure cylinder. The method further includes sensing by the at least one sensor occurring in an absence of or prior to separation of the punched labels, the backing web, and the matrix web from one another. The method further includes sensing by the at least one sensor occurring without disruption of operation of the rotary die cutting device.

In one embodiment, a rotary die cutting device includes a die cutting cylinder, a counter pressure cylinder separated from the die cutting cylinder by a gap, and a control system comprising a controller, at least one sensor, and an adjusting device actuated by the control system, and components of the control system communicate with one another within a machine network. The rotary die cutting device further includes the adjusting device is operably connected to the die cutting cylinder and the counter pressure cylinder. The rotary die cutting device further includes in response to the at least one sensor sensing a deviation from a desired state, the control system is adapted to operate in a closed feedback loop for setting a gap dimension of the gap between the rotary die cutting device and the counter pressure cylinder. The rotary die cutting device further includes during operation of the rotary die cutting device, a backing web and an overlying second web are directed between the die cutting cylinder and the counter pressure cylinder, the second web becoming punched labels and a matrix web subsequent to being directed between the die cutting cylinder and the counter pressure cylinder. The rotary die cutting device further includes sensing by the at least one sensor occurring in an absence of or prior to separation of the punched labels, the backing web, and the matrix web from one another. The rotary die cutting device further includes sensing by the at least one sensor occurring with or without disruption of operation of the rotary die cutting device.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The invention makes the die cutting process less prone to human error and reduces downtime/costs from damages caused by splices, extends die life & produces higher quality and consistent product, reduces waste by perfecting the impression such that only the waste matrix is lifted off the product, increase throughput by eliminating stoppages to address the aforementioned problems. More specifically, the die depth cut formed in a material passing between a die cutting cylinder and a counter pressure cylinder of a rotary die cutting device is automatically controlled, employing a closed feedback loop, utilizing sensors that permit continuous or undisrupted operation of the rotary die cutting device.

Figure 1:
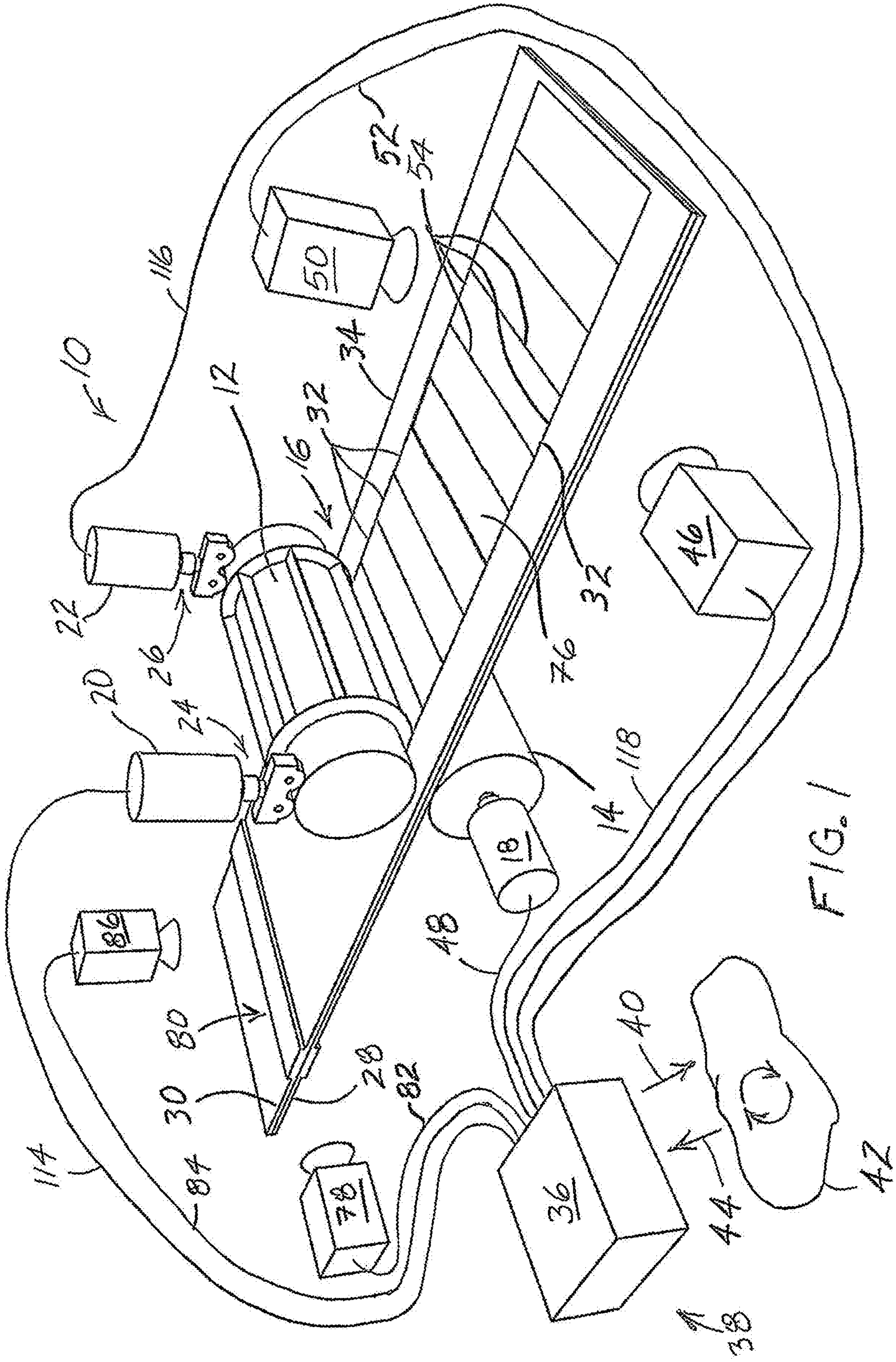
FIG. 1 is an upper perspective view of an exemplary rotary die cutting device.

FIG. 1 shows an exemplary rotary die cutting device 10 including a die cutting cylinder 12 and a counter pressure cylinder 14 separated from the die cutting cylinder 12 by a gap 16. Stated another way, gap 16 is the distance between the blades of die cutting cylinder 12 and counter pressure cylinder 14. An adjusting device 18 such as an actuator powered by an electric motor, a hydraulic motor or other suitable power source is operably connected to counter pressure cylinder 14 for increasing or decreasing a dimension or gap dimension of gap 16, depending upon the direction of travel of adjusting device 18 (i.e., away from or toward die cutting cylinder 12). In one embodiment, adjusting device 18 may be arranged differently, such as being operatively connected to one or both of die cutting cylinder 12 and counter pressure cylinder 14. A pair of actuators 20, 22 such as actuators powered by electric motors, hydraulic motors or other suitable power sources, as controlled by controller 36 via respective conduits 114, 116 or via wireless communication therebetween, are operably connected to opposite ends of die cutting cylinder 12 for selectively applying forces or pressures (force/area) to the ends of die cutting cylinder 12 for controlling pressure between die cutting cylinder 12 and counter pressure cylinder 14. More specifically, a backing web 28 and an overlying web 30 are directed between die cutting cylinder 12 and counter pressure cylinder 14, which overlying web 30 becoming punched labels 32 and a matrix web 34 subsequent to being directed between the die cutting cylinder 12 and the counter pressure cylinder 14. A pair of sensors 24, 26 are operably in contact with opposite ends of die cutting cylinder 12 for sensing parameters such as pressure measurements associated with the operation of respective actuators 20, 22 that are communicated with a controller 36 or processor or control unit. A control system 38 includes controller 36, actuators 20, 22, adjusting device 18, and sensors 24, 26, as well as other sensors to be discussed in additional detail below in the various embodiments. Controller 36 is adapted or configured to provide alerts/logging information 40 and receive historical run data or updates to software or firmware 44 from a storage 42 or storage device such as cloud storage or the internet of things ("IoT") as is well known and not further discussed herein.

In one embodiment, sensor 46, as controlled by controller 36 via conduit 118 or via wireless communication therebetween, measures a thickness of backing web 28, overlying web 30 or both that remains subsequent to being directed between the die cutting cylinder 12 and the counter pressure cylinder 14, which thickness measurement may occur subsequent to or prior to removal of matrix web 34. A database of historical runs (stored in storage 42) corresponding with the same or similar die cutting cylinder 12, counter pressure cylinder 14, overlying web 30 material and thickness is used to lookup what gap 16 was used to produce desirable results in the past. An algorithm in the controller 36 determines the signal to send to adjusting device 18 via conduit 48 or via wireless communication therebetween in order to achieve the same gap 16 that was returned from the database in storage 42.

In one embodiment, sensor 50 sends signals into the input nodes of a neural network located in storage 42 via conduit 52 or via wireless communication therebetween. The neural network classifies the die cut 54 along the perimeter of corresponding punched labels 32 according to predefined categories. The classified die cut from the neural network is compared to a desired result and an error is determined. An algorithm in controller 36 uses the error to determine the signal to send to adjusting device 18 in order to achieve the desired result. In embodiment, sensor 50 may also be used to detect missing punched labels 76 and send alerts from controller 36 to storage 42.

Figure 4:
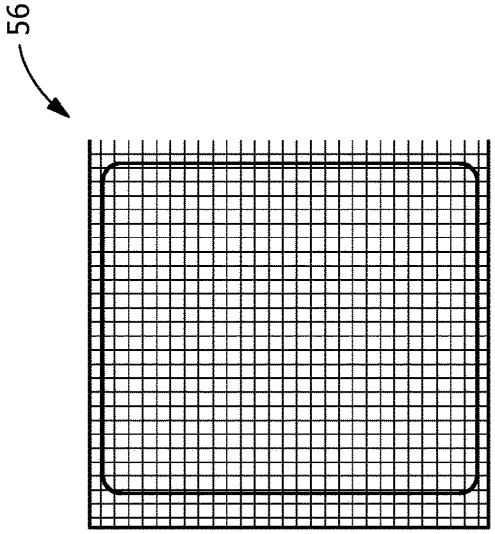
FIG. 4 is an exemplary die strike image.
Figure 6:
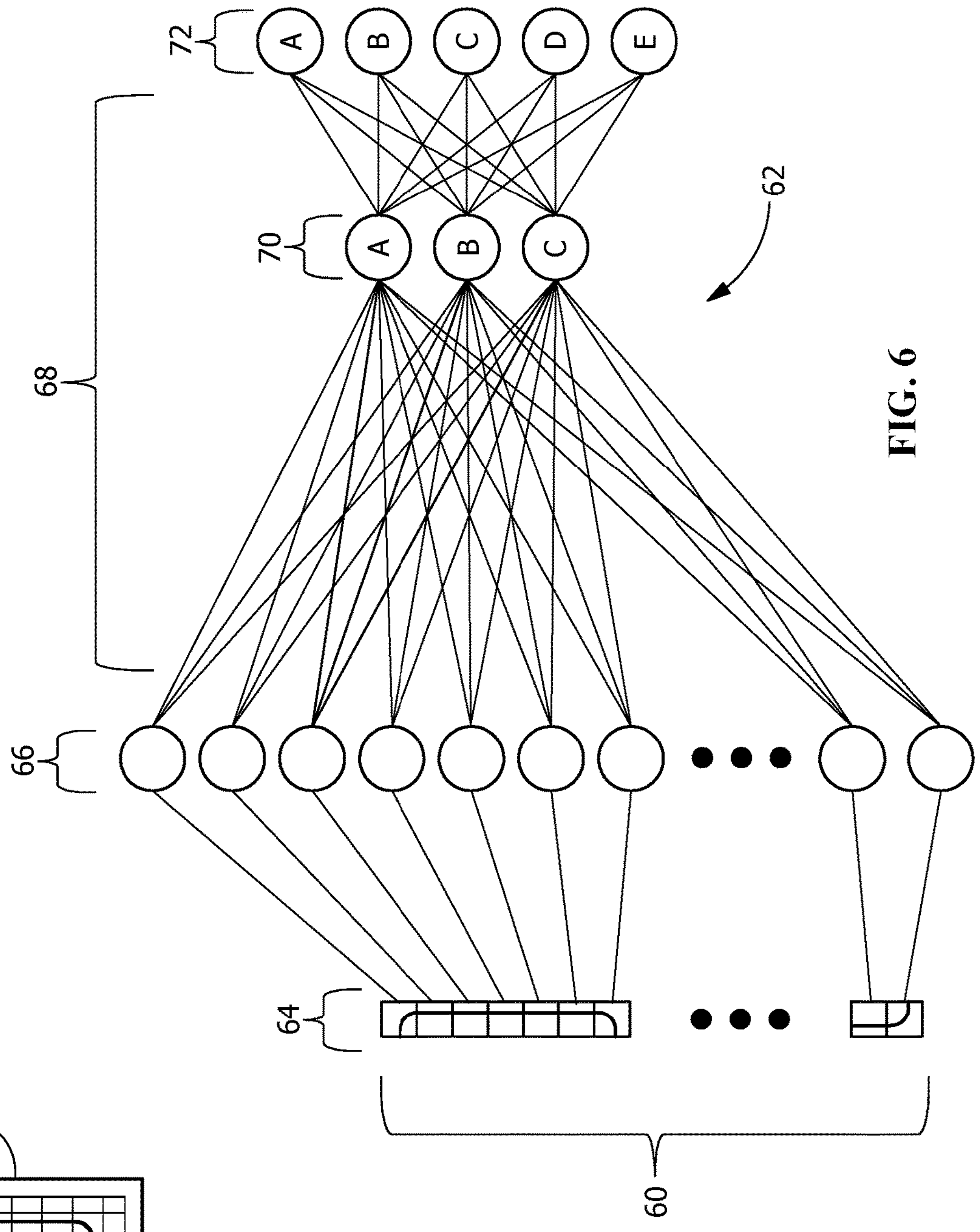
FIG. 6 is a schematic of an exemplary deep learning method how to classify rotary die cutting device impressions by using convolutional filters to feed imagery grayscale intensity values into a convolutional neural network.
Figure 5:
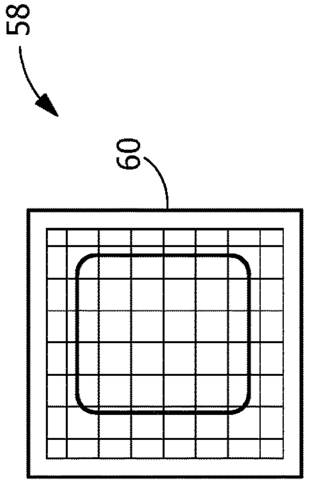
FIG. 5 is an exemplary max pooling of the image of FIG. 4.

For example, from an exemplary die impression image 56 (FIG. 4), an exemplary max pooling 58 (FIG. 5) is convolved, extracting the outer perimeter region 60 (FIG. 5) for use in a neural network 62 (FIG. 6). That is, as shown in FIG. 6, in neural network 62, information from outer perimeter region 60 (FIG. 5) from max pooling 58 (FIG. 5) is transported and flattened in a one dimensional array 64 that is provided as nodes of an input layer 66 that are assigned different values (weights and biases) for calculations, sometimes referred to as perceptrons, in hidden layers 68 to die impression predictors 70 identified as a light impression predictor 70A, a medium impression predictor 70B, and a heavy impression predictor 70C. The die impression predictors 70A, 70B, 70C of hidden layers 68 correspond to exemplary output layers 72 identified as actuator 20 (FIG. 1) voltage 72A, actuator 22 (FIG. 1) voltage 72B, counter pressure cylinder 14 (FIG. 1) drive speed 72C, predicted die cutter cylinder 12 (FIG. 1) life remaining 72D, and predicted bearing service date 72E (associated with one or both of die cutter cylinder 12 (FIG. 1) and counter pressure cylinder 14 (FIG. 1)). As a result, in response to being provided with die impression images 56 (FIG. 4) at predetermined time intervals or intervals of punched labels 32 (FIG. 1) passing sensor 50 (FIG. 1), which may include every punched label 32 or other interval of punched label 32 (FIG. 1), neural network 62 (FIG. 6), control system 38 operates utilizing a closed feedback loop permits continuous operation of die cutter device 10 (FIG. 1), i.e., wherein sensing by the plurality of sensors occurs without disruption of operation of the rotary die cutting device. In one embodiment, sensing by the plurality of sensors occurs with disruption of operation of the rotary die cutting device. In other words, in response to at least one sensor sensing a deviation from a desired state, the control system 38 (FIG. 1) is adapted to operate in a closed feedback loop for setting a gap dimension of the gap 16 (FIG. 1) between the rotary die cutting device 12 (FIG. 1) and the counter pressure cylinder 14 (FIG. 1). Stated another way, die cut depth adjustment is determined by a neural network.

The neural network 62 permits different weightings in the hidden layer 68 portion to accommodate different preferences of different operators. In other words, such preferences could be changed, corresponding to the working hours of the different operators, and could be performed manually or automatically, such as upon the operator "clocking in" for a work shift.

In one embodiment, the neural network operates utilizing one or more sensors sensing parameters in an absence of or prior to separation of the punched labels 32 (FIG. 1), the backing web 28 (FIG. 1), and the matrix web 34 (FIG. 1) from one another, and wherein sensing by the plurality of sensors occurring with or without disruption of operation of the rotary die cutting device 10 (FIG. 1), such as will be described in further detail in one of more of the embodiments.

Feedback to the automated control process may include specifications or measurements pertaining to the die cutting cylinder 12 (FIG. 1), material being cut (e.g., webs 28, 30 (FIG. 1)) or other process parameters affecting the quality of the die cut 54 (FIG. 1).

Figure 3:
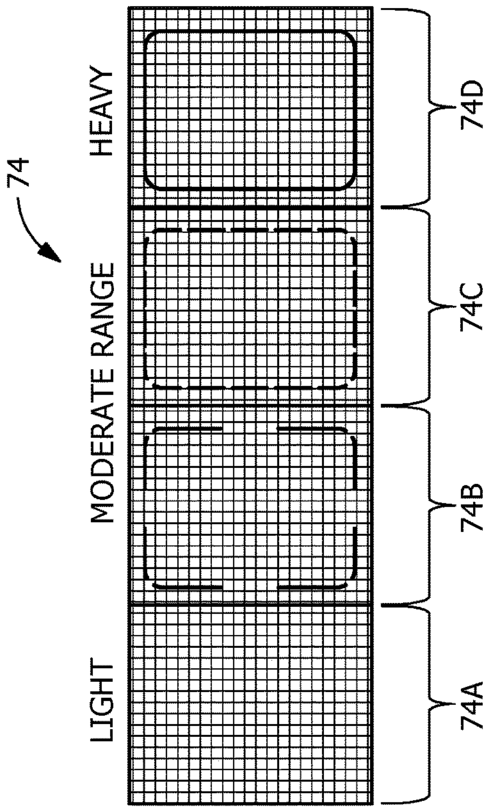
FIG. 3 is an exemplary die strike image guide.

The above closed feedback loop or automated control process is a significant improvement over current manual processes, in which an operator (not shown) utilizing an exemplary die impression image guide 74 (FIG. 3) (image 74A corresponding to a light die impression, images 74B, 74C corresponding to a range of moderate die impressions, and image 74D corresponding to a heavy die impression), must first disrupt operation of the rotary die cutting device 10 (FIG. 1), review a portion of the webs, determine the deviation from the desired state, make manual adjustment, then restart operation of the rotary die cutting device 10 (FIG. 1), possibly needing to repeat if the operator's deviation determination was incorrect.

In one embodiment, control system 38 employs artificial intelligence methods to control the rotary die cutting device 10.

In one embodiment, control system 38 employs machine learning methods to control rotary die cutting device 10.

In one embodiment, control system 38 employs deep learning methods to control rotary die cutting device 10.

In one embodiment, as further shown in FIG. 1, sensor 78 senses and communicates deviations 80 in linear thickness (e.g., prior to encountering deviation 80 or anomaly from a desired state (e.g., desired or nominal thickness or thickness state) such as a splice, in which one or both of backing web 28 and overlying web 30 has an increased thickness compared to a non-splice portion) to controller 36 via conduit 82 or via wireless communication therebetween so that adjusting device 18 will cause counter pressure cylinder 14 to sufficiently increase gap 16 relative to die cutting cylinder 12 to reduce or eliminate die wear and damage. Subsequent to deviation 80 being directed between die cutting cylinder 12 and counter pressure cylinder 14, gap 16 between die cutting cylinder 12 and counter pressure cylinder 14 is restored to the gap dimension in use immediately prior to encountering deviation 80.

It is to be understood that a deviation from a desired state as a result of a change in thickness of at least one of the backing web 28 and overlying web 30 may also be due to thermal expansion of web material or of equipment, a change in humidity of an environment surrounding rotary die cutting device 10, a change in a tension gradient of at least one of the backing web 28 and overlying web 30, a cut depth of punched labels 32 and the matrix web 34, and an impression quality of punched labels 32 and matrix web 34 or other reasons.

In one embodiment, a deviation from a desired state may also be as a result of at least one of a change of material of at least one of a backing web 28 and an overlying web 30 (the overlying second web becoming punched labels and a matrix web subsequent to being directed between the die cutting cylinder and the counter pressure cylinder). In other words, if there is a first roll of backing web 28 and an overlying web 30 and a second roll of backing web 28 and an overlying web 30 with the respective materials of at least one of the webs 28, 30 being different, i.e., having different hardness values, the pressures applied by actuators 20, 22 (FIG. 1) to achieve the same impression depth for each roll would be different.

In one embodiment, sensor 78 senses and communicates deviations 80 in linear thickness (e.g., splices) to controller 36 so that actuators 20, 22 respond to reduce the pressure between die cutting cylinder 12 and counter pressure cylinder 14 in order to reduce or eliminate wear and damage to die cutting cylinder 12. Subsequent to deviation 80 being directed between die cutting cylinder 12 and counter pressure cylinder 14, pressures applied by actuators 20, 22 is restored to the applied pressures in use immediately prior to encountering deviation 80.

In one embodiment, as further shown in FIG. 1, sensor 78 senses and communicates deviations 80 in linear thickness, combining the functionality of adjusting both gap 16 utilizing adjusting device 18 and pressures utilizing actuators 20, 22 as previously discussed.

In one embodiment, sensor 78 senses and communicates deviations 80 in linear thickness, combining the functionality of adjusting both gap 16 utilizing adjusting device 18 and pressures utilizing actuators 20, 22 as previously discussed, except a sensor 86, which positioned vertically above webs 28, 30 (instead of sensor 78 that is laterally positioned relative to webs 28, 30) senses and communicates deviations 80 with controller 36 via conduit 84 or wirelessly therebetween.

In one embodiment, sensor 78 senses and communicates deviations 80 in linear thickness, combining the functionality of adjusting both gap 16 utilizing adjusting device 18 and pressures utilizing actuators 20, 22 as previously discussed, or a sensor 86 similarly performs the function of sensor 78, which sensor 86 is positioned vertically above webs 28, 30 (instead of sensor 78 that is laterally positioned relative to webs 28, 30) senses and communicates deviations 80 with controller 36 via conduit 84 or wirelessly therebetween. In this embodiment, deviations 80 are detected through use of a trained neural network such as similar to neural network 62 (FIG. 6).

In one embodiment, die pressure is controlled to a setpoint, versus measured pressures, through use of feedback control. Sensors 24, 26 sense and communicate pressure measurements and change die pressure as controlled by controller 36 that is associated with the operation of respective actuators 20, 22 in order to reduce or eliminate the error between the setpoint and measured pressures as sensed and measured by sensors 20, 22.

In one embodiment, any or all activities from the sensors and actuators are sent to cloud storage.

Figure 2:
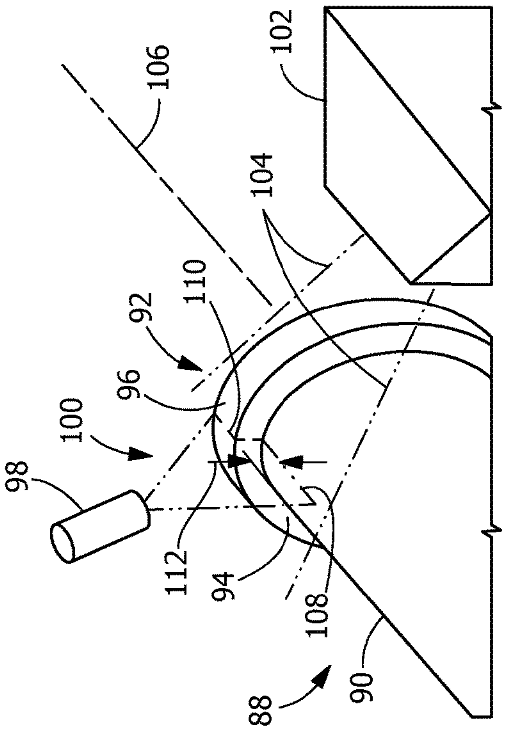
FIG. 2 is a partial upper perspective view of an exemplary sensor for measuring wear.

In one embodiment, such as shown in FIG. 2, an arrangement for measuring wear of a component of rotary die cutting device is now discussed. As shown, a component 88, such as a counter pressure cylinder 14 (FIG. 1) or other component having similar geometric surfaces as described herein includes a wear surface 90 terminating at a step 92 having a step surface 94 that is generally perpendicular to wear surface 90, and a step surface 96 that is both parallel to and offset from wear surface 90. A fixed laser source 98 directs a planar laser beam 100 that is parallel to a rotational axis 106 of component 88. Laser beam portion 108 strikes wear surface 90 and laser beam portion 110 strikes step surface 96. A camera-based sensor 102 such as DSE26C infrared sensor manufactured by Maxcess Americas is outfitted with an optical filter such that sensing region 104 of sensor 102 only "sees" or senses laser beam 100. When sensing region 104 of sensor 102 is arranged between 45 degrees and 60 degrees relative to planar laser beam 100 such that sensing region 104 also senses parallel laser beam portions 108, 110, control system 38 (FIG. 1) may be adapted to measure a distance 112 between laser beam portions 108, 110, and compare measured distance 112 with the distance between the same surfaces prior to installation of component 88 into the rotary die cutting device, (i.e., when component 88 was new) thereby permitting calculation of the extent of relative wear between wear surface 90 and surface 96. As a result, this arrangement permits proactive maintenance measures and/or for alerting operators. In one embodiment, the sensors of previously embodiments are multipurposed for use in this embodiment as well as in their original embodiments.

In one embodiment, information from one or all sensors of one or all embodiments is transmitted to and from storage 42, including an IoT framework, an onsite network infrastructure or on a local media located in controller 36.

In one embodiment, the neural network is deployed with the ability to perform training on demand at the location of deployment or remotely from an offsite location, both occurring either during operation or not.

In one embodiment, a custom neural network is constructed for isolated or combined parameters present within the control system 38 (FIG. 1) or process (i.e., customer neural networks for each different type of web material, each different die cutting cylinder, each different counter pressure cylinder, each different line speed setting, etc.).

In one embodiment, sensors (such as those detecting deviations in linear thickness) communicate within a machine network that is located at a facility ("on site"). This arrangement allows seamless combinations of new and existing technologies present in the facility by using proprietary communication protocol. The machine network may also comprise various sensors from different sites. The communication protocol may also be non-proprietary.

For purposes herein, the term "machine network" is intended to mean two or more connected devices sharing time sensitive information with predictable and consistent data delivery timing with the understanding that stable closed loop operation being highly dependent on minimizing data delivery timing jitter. Network-based closed loop control is realized using time stamped sensor information representing the actual output being sent via network to the controller for comparison to the desired output to produce a corrective signal at a desired precise time to the adjusting device. Network communication can be realized using any supported signaling method and protocol packet structure as long as all devices are using compatible strategies.

Surprisingly, results including the deep learning method used for strike impression characterization handles both transparent and opaque materials with equal effectiveness. Another surprise is the high accuracies that are attainable with little training.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method for setting a gap dimension of a gap between a die cutting cylinder and a counter pressure cylinder of a rotary die cutting device, comprising:

providing a control system comprising a controller, at least one sensor, and an adjusting device actuated by the control system;

setting a desired trained criterion;

sensing, via the at least one sensor, at least a die cut along a perimeter of a web being processed from a desired state which includes a set of one or more detectable parameters with quantifiable and measurable variables, wherein the at least die cut along the perimeter of the web is compared to the desired state and a deviation or an error is determined, wherein the deviation or error is used to determine a signal to send to the adjusting device to achieve a desired result; and actuating the adjusting device in response to the at least one sensor sensing the deviation from the desired state, thereby adjusting the gap dimension between the rotary die cutting device and the counter pressure cylinder, wherein actuating the adjusting device is achieved as a result of the control system operating in a closed feedback loop;

wherein subsequent to the deviation being directed between the die cutting cylinder and the counter pressure cylinder, the gap between the die cutting cylinder and the counter pressure cylinder is adjusted to return the web to the desired state pursuant to the trained criterion that was saved and subsequently retrieved to maintain the desired state;

wherein setting the desired trained criterion depends on a change in properties of the web; and wherein sensing by the at least one sensor occurring with or without disruption of operation of the rotary die cutting device.

2. The method of claim 1, wherein the step of actuating the adjusting device includes the deviation from the desired state being a splice joint of at least one of a backing web and an overlying second web of the web.

3. The method of claim 1, wherein the step of actuating the adjusting device includes the deviation from the desired state being a change in thickness of at least one of a backing web and an overlying second web of the web.

4. The method of claim 1, wherein the step of actuating the adjusting device includes the deviation from the desired state being at least one of a backing web and an overlying second web of the web and an overlying second web, the overlying second web becoming punched labels and a matrix web subsequent to being directed between the die cutting cylinder and the counter pressure cylinder, a thermal expansion of at least one of the backing web and the overlying second web, a change in humidity of an environment surrounding the rotary die cutting device, a change in a tension gradient of at least one of the backing web and the overlying second web, a cut depth of the punched labels and the matrix web, and an impression quality of the punched labels and the matrix web.

5. The method of claim 1, wherein the control system employs artificial intelligence methods to control the rotary die cutting device.

6. The method of claim 1, wherein the control system employs machine learning methods to control the rotary die cutting device.

7. The method of claim 1, wherein the control system employs deep learning methods to control the rotary die cutting device.

8. The method of claim 1, wherein a neural network is configured to permit different weightings in a hidden layer portion thereof to accommodate different preferences of different operations.

9. A method for setting a gap dimension of a gap between a die cutting cylinder and a counter pressure cylinder of a rotary die cutting device, comprising:

providing a control system comprising a controller, at least one sensor, and an adjusting device actuated by the control system;

setting a desired trained criterion;

sensing, via the at least one sensor, at least a die cut along a perimeter of a workpiece being processed from a desired state which includes a set of one or more detectable parameters with quantifiable and measurable variables, wherein the at least die cut along the perimeter of the workpiece is compared to the desired state and a deviation or an error is determined, wherein the deviation or error is used to determine a signal to send to the adjusting device to achieve a desired result; and actuating the adjusting device in response to the at least one sensor sensing the deviation from the desired state, thereby adjusting the gap dimension between the rotary die cutting device and the counter pressure cylinder, wherein actuating the adjusting device is achieved as a result of the control system operating in a closed feedback loop;

wherein subsequent to the deviation being directed between the die cutting cylinder and the counter pressure cylinder, the gap between the die cutting cylinder and the counter pressure cylinder is adjusted to return the workpiece to the desired state pursuant to the trained criterion that was saved and subsequently retrieved to maintain the desired state;

wherein setting the desired trained criterion depends on a change in properties of the workpiece;

wherein during operation of the rotary die cutting device, a backing web and an overlying second web of the workpiece are directed between the die cutting cylinder and the counter pressure cylinder, the second web becoming punched labels and a matrix web of the workpiece subsequent to being directed between the die cutting cylinder and the counter pressure cylinder;

wherein sensing by the at least one sensor occurring in an absence of or prior to separation of the punched labels, the backing web, and the matrix web from one another; and wherein sensing by the at least one sensor occurring with or without disruption of operation of the rotary die cutting device.

10. The method of claim 9, wherein the step of actuating the adjusting device includes the deviation from the desired state being a splice joint of at least one of the backing web and the overlying second web.

11. The method of claim 9, wherein the step of actuating the adjusting device includes the deviation from the desired state being a change in thickness of at least one of the backing web and the overlying second web.

12. The method of claim 9, wherein the step of actuating the adjusting device includes the deviation from the desired state being at least one of a change of material of at least one of the backing web and the overlying second web, the overlying second web becoming punched labels and the matrix web subsequent to being directed between the die cutting cylinder and the counter pressure cylinder, thermal expansion of at least one of the backing web and the overlying second web, a change in humidity of an environment surrounding the rotary die cutting device, a change in a tension gradient of at least one of the backing web and the overlying second web, a cut depth of the punched labels and the matrix web, and an impression quality of the punched labels and the matrix web.

13. The method of claim 9, wherein the control system employs artificial intelligence methods to control the rotary die cutting device.

14. The method of claim 9, wherein the control system employs machine learning methods to control the rotary die cutting device.

15. The method of claim 9, wherein the control system employs deep learning methods to control the rotary die cutting device.

* * * * *